(No Model.)

N. STALKER.
HORSE CONTROLLER.

No. 549,545. Patented Nov. 12, 1895.

Witnesses:
E. J. Hyde
A. L. Juan

Inventor,
Neil Stalker,
by Harry R. Williams
atty.

UNITED STATES PATENT OFFICE.

NEIL STALKER, OF HARTFORD, CONNECTICUT, ASSIGNOR TO GEORGE C. FORREST, OF SAME PLACE.

HORSE-CONTROLLER.

SPECIFICATION forming part of Letters Patent No. 549,545, dated November 12, 1895.

Application filed September 16, 1895. Serial No. 562,592. (No model.)

*To all whom it may concern:*

Be it known that I, NEIL STALKER, a citizen of the United States, residing at Hartford, in the county of Hartford and State of Connecticut, have invented certain new and useful Improvements in Horse-Controllers, of which the following is a specification.

The invention relates to those devices that are constructed and attached to the bridle of a harness in such manner that should a horse on which the bridle is placed become unmanageable and exert a strong pull on the lines a part will impinge on the outside of the mouth and cause the horse to desist from pulling and submit to control.

The object of the invention is to provide a device of this class which can be simply and cheaply constructed and which can be easily and quickly placed in position for effective use in an inconspicuous manner.

Figure 1:
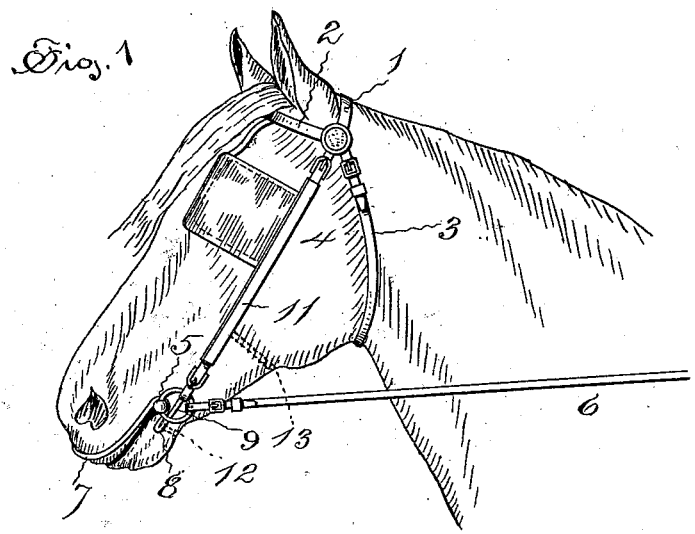
Figure 2:
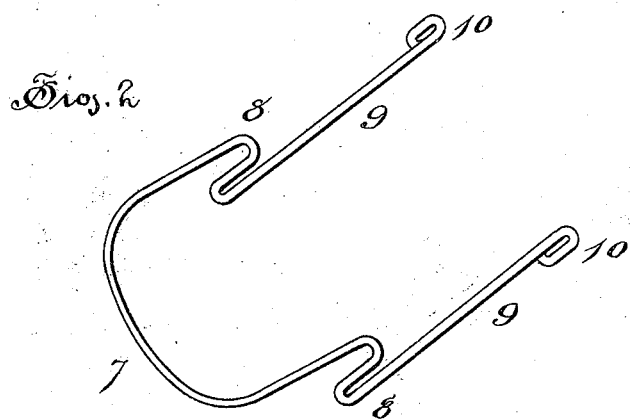
Figure 3:
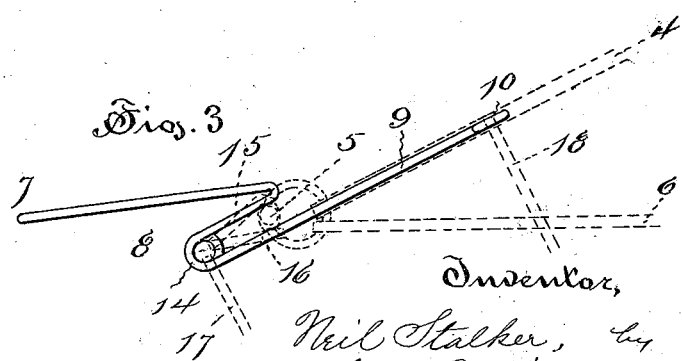

Referring to the accompanying drawings, Figure 1 is a view of the head of a horse, showing one of the devices in position for use. Fig. 2 is a perspective view of the device, and Fig. 3 is a side view of a modified form of the device.

The bridle illustrated in the views is a common closed bridle having the usual head-piece 1, crown-piece 2, throat-latch 3, cheek-pieces 4, and bit 5. The cheek-pieces of the bridle shown are provided with ordinary blinders, and they are buckled to the bit-rings with the driving-reins 6 in the customary way.

The improved controller consists of a single piece of metal, as a steel rod, bent so as to have a U-shaped section 7, that is adapted to pass around the nose of the horse above the mouth and below the nostrils, S-shaped sections 8, that are so bent by doubling back a rod upon itself that they partially encircle the bit inside of the rings, and end sections 9, that extend rearwardly and upwardly from the bent sections in such manner that when the device is in position these end sections will lie behind or adjacent to the cheek-pieces and in line therewith. Usually eyes 10 are formed at the ends of the rod, whereby the ends are readily attached to the cheek-pieces, if desired.

In the controller shown in Fig. 1 the U-shaped part 7 passes around the upper lip of the horse above the mouth and below the nostrils, and the S-sections are so arranged that the rod first passes backward above the bit and then forward and backward below the bit inside of the bit-rings, the end sections so extending backward and upward beneath the cheek-pieces as to be concealed from view. The ends may be thrust into the box-sections 11 of the cheek-pieces of the bridle, and, if desired, a strap may be passed from the bent portion under the lower lip of the horse, as shown at 12 in dotted outline, or a strap may pass from the eyes at the ends of the rod under the jaw of the horse farther up, as shown at 13 in dotted outline.

The device bent to the form shown in Fig. 1, as above described, can be easily placed in position. The S-bend portions are slipped over the bit and so surround it that the controller will not drop off, and so that when a strong pull is exerted on the driving-reins the bit will be drawn back into the bends and pull the rod, causing the U-shaped section to impinge against the upper lip of the horse and bring him under control. The ends of the rod when tucked into or laid beneath the cheek-pieces are concealed from view, and this also prevents the U-shaped section from turning around on the bit, so that it can come off. With this construction it is not necessary to provide any straps for attaching the rod to the bit, which will readily draw back the rod when a strong pull is exerted, and it makes contact with the end of the bent sections, and the device will not drop off, but always remain in position for effective use.

In the form shown in Fig. 3 the upper bends of the rod are made smaller than the lower so that the rod will pass backward, then forward above the bit, and then, after bending backward, pass under the bit and extend along the cheek-pieces. In this form the lower bends of the S-sections will probably be made larger than the upper and the bit will lie in the position shown in dotted outline in Fig. 3 when the device is in use. The eyes 14 may be provided with this shape at the bends of the S-sections and straps may pass from these eyes to the bit-rings, either above where the ring joins the bit, as shown by the dotted line 15, or below where the ring joins the bit, as shown by the dotted line 16. A strap may also, as above described, be passed through the ends of the bends or through these eyes 14 so as to lie under the lower jaw of the horse, as at 17 in Fig. 3, or one may be passed through the ends or the eyes 10, so as to lie beneath the jaw higher up, as at 18 in Fig. 3. With this latter construction the rod is connected with the bit in such manner that it can be easily placed in position, so that it will not come off or move up and down, while the ends extend along the cheek-pieces, as with the form first described.

The device embodying the invention is very simple, and it is cheap to construct, for it can be bent to shape from a single piece of rod or wire. It can be quickly placed in position by any one in such manner that it will be effective when desired. A number of straps are not required to be buckled and unbuckled for attaching or removing the device, and this makes its application simple and easy and renders the placing on of the bridle with the device in place easy and also obviates the necessity of irritating supporting-straps, which annoy the horse and disfigure the head.

I claim as my invention—

A horse controller consisting of a rod of metal formed to shape with S bends about the middle of its length, a U-shaped section joining the S bends, and end sections bent to extend backward and upward adjacent to and along the cheek pieces of the bridle, substantially as specified.

NEIL STALKER.

Witnesses:
E. J. HYDE,
H. R. WILLIAMS.